United States Patent
Cutler

(10) Patent No.: US 9,639,087 B1
(45) Date of Patent: May 2, 2017

(54) EMERGENCY LANDING USING INERTIAL SENSORS

(71) Applicant: Kitty Hawk Corporation, Mountain View, CA (US)

(72) Inventor: Mark Johnson Cutler, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/371,045

(22) Filed: Dec. 6, 2016

(51) Int. Cl.
| | |
|---|---|
| *G06F 19/00* | (2011.01) |
| *G05D 1/06* | (2006.01) |
| *B64C 27/12* | (2006.01) |
| *B64C 27/08* | (2006.01) |
| *B64D 25/00* | (2006.01) |
| *G08G 5/00* | (2006.01) |

(52) U.S. Cl.
CPC ........... *G05D 1/0676* (2013.01); *B64C 27/08* (2013.01); *B64C 27/12* (2013.01); *B64D 25/00* (2013.01); *G08G 5/0056* (2013.01)

(58) Field of Classification Search
CPC combination set(s) only.
See application file for complete search history.

(56) References Cited

U.S. PATENT DOCUMENTS

| 7,397,363 B2* | 7/2008 | Joao | B60R 25/102 |
| | | | 307/10.2 |
| 7,487,939 B1* | 2/2009 | Christof | B64D 17/80 |
| | | | 244/139 |
| 2009/0065635 A1* | 3/2009 | Regis | B64C 25/426 |
| | | | 244/81 |
| 2013/0179011 A1* | 7/2013 | Colby | G01C 21/20 |
| | | | 701/16 |
| 2016/0376031 A1* | 12/2016 | Michalski | B64F 1/36 |
| | | | 701/15 |

OTHER PUBLICATIONS

Mueller et al., "Critical subsystem failure mitigation in an indoor UAV testbed", from the 2012 IEEE/RSJ International Conference on Intelligent Robots and Systems, pp. 780-785, Oct. 7-12, 2012.

* cited by examiner

*Primary Examiner* — Hussein A. Elchanti
(74) *Attorney, Agent, or Firm* — Van Pelt, Yi & James LLP

(57) ABSTRACT

An emergency landing procedure that includes a sequence of control settings is continuously generated. An aircraft is landed, including by using the sequence of control settings and a set of one or more inertial sensors to control an actuator.

15 Claims, 8 Drawing Sheets

EMERGENCY LANDING USING INERTIAL SENSORS

BACKGROUND OF THE INVENTION

An important consideration aircraft designers need to take into account is how to handle component failures. Although techniques exist for addressing when such failures occur, they may not be suitable or appropriate for all types of aircraft. For example, some aircraft simply use redundancy to address any component failures. If a particular component fails, then there is at least one other backup component which can take over. However, for expensive and/or heavy components this adds cost and/or weight to the aircraft. For lighter and/or more inexpensive aircraft, simply duplicating components is not an attractive solution. New techniques for handling a component failure which are less expensive and/or lighter would be desirable.

BRIEF DESCRIPTION OF THE DRAWINGS

Various embodiments of the invention are disclosed in the following detailed description and the accompanying drawings.

DETAILED DESCRIPTION

Figure 1:
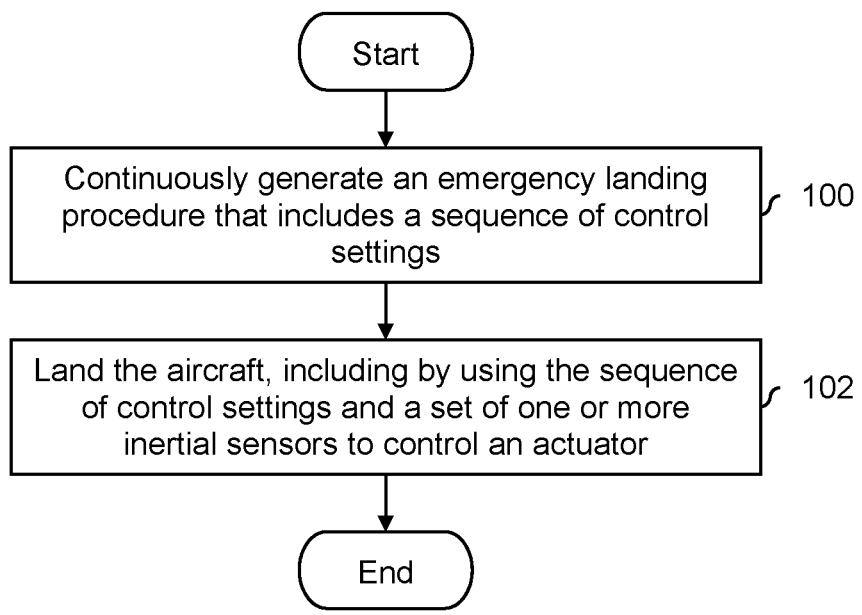
FIG. 1 is a flowchart illustrating an embodiment of a process to continuously generate an emergency landing procedure and land an aircraft using the emergency landing procedure and a set of one or more inertial sensors.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to continuously generate an emergency landing procedure and land an aircraft using the emergency landing procedure and a set of one or more inertial sensors are described below. By continuously generating an emergency landing procedure, the emergency landing procedure is able to (e.g., proactively) incorporate up-to-date state information and (e.g., proactively) use all available sensors such as GPS or LIDAR (e.g., before any of those sensors fail). The aircraft is not reactively planning based on scenario, but rather proactively executing a sequence of pre-determined commands. If or when the emergency landing procedure is used to land the aircraft, a sequence of control settings (e.g., including times at which those control settings are applied or otherwise used) and inertial sensors are used to control an actuator (e.g., a motor) included in the aircraft. For example, the inertial sensor may be part of a feedback loop which adjusts a motor (e.g., propeller motors or rotor motors) or an actuator (e.g., flaps or control surfaces on winged airplanes) so that the aircraft is flying at the specified desired attitude or other value.

FIG. 1 is a flowchart illustrating an embodiment of a process to continuously generate an emergency landing procedure and land an aircraft using the emergency landing procedure and a set of one or more inertial sensors. In some embodiments, the process is performed by a relatively inexpensive and/or lightweight aircraft, such as a single-seat multicopter. In some embodiments, the process is performed by a recreational aircraft which is rented out (e.g., so that at least some of the pilots are inexperienced and/or unfamiliar with the controls of the aircraft).

At 100, an emergency landing procedure that includes a sequence of control settings is continuously generated. For example, step 100 is performed during a normal flight mode where the emergency landing procedure is not actually used. Since updated emergency landing procedures are continuously being generated (e.g., based on the aircraft's current position and other state information), the emergency landing procedure is proactively generated, as opposed to reactively.

In some embodiments, continuously generating an emergency landing procedure at step 100 includes determining times at which the control settings in the sequence are applied. In some embodiments, the sequence of control setting includes a sequence of desired attitudes (e.g., where each desired attitude includes one or more desired angles with respect to a roll axis, a pitch axis, and/or a yaw axis) and a sequence of command thrusts. In one example, step 100 includes determining a first desired attitude, a first command thrust, a corresponding a time at which those values are applied; determining a second desired attitude, a second command thrust, and a corresponding time at which those values is applied; etc.

At 102, the aircraft is landed, including by using the sequence of control settings and a set of one or more inertial sensors to control an actuator. For example, step 102 is performed if it is decided that the aircraft needs to land immediately (e.g., using the most recent emergency landing procedure) and the pilot is unable or unwilling to perform the landing. This is sometimes referred to as switching from a normal flight mode to an emergency landing mode. Some examples of what would trigger this change are described in more detail below.

In some embodiments, the actuator (e.g., which is configured or otherwise controlled at step 102) is associated with a rotor or propeller in a multicopter. For example, the multicopter may have a plurality of rotors which are oriented in the horizontal plane (e.g., like a helicopter) where the rotors are mounted to the aircraft in a fixed manner so the rotors cannot tilt or rotate with respect to the rest of the aircraft. To navigate this type of multicopter, the various rotors are rotated at different speeds to create lift differentials between the rotors (e.g., there are no flaps or wings which are moved or otherwise adjusted in order to steer the aircraft). In one example, the aircraft is a quadcopter and the actuator which is controlled at step 102 is associated with one of the four rotors of the quadcopter.

In some embodiments, at least some of the inertial sensors (e.g., being controlled at step 102) is/are part of a feedback loop. For example, suppose the sequence of control settings includes desired attitudes and step 102 is performed (at least in part) by an inertial navigation system (e.g., which is sometimes referred to as an inertial measurement unit and includes one or more inertial sensors). The inertial navigation system may include a feedback loop where the desired attitude is compared against a measured attitude (e.g., obtained or otherwise generated from an accelerometer and/or gyroscope, which are two types of inertial sensors) in order to generate an error value. An example of this is described in more detail below. In some embodiments, the sequence of control settings also includes commanded thrusts which are not part of the feedback loop which adjusts based on the current desired attitude (e.g., the sequence of commanded thrusts are asserted or otherwise used in open loop mode).

An inertial sensor (e.g., which is used in step 102 to land the aircraft) is a sensor which uses inertia (e.g., with measurements taken by accelerometers and gyroscopes) to track or otherwise determine the orientation of an aircraft. Some examples of inertial sensors include (e.g., MEMS) accelerometers or (e.g., MEMS) gyroscopes. Current inertial sensors are very robust and are often able to run hundreds of thousands of hours before a failure occurs and they are therefore a good choice to use in a feedback loop when an emergency landing procedure is executed. It is impossible to land a multicopter with a completely open loop system and since inertial sensors are very robust it makes sense to use them in the feedback loop (e.g., because the emergency landing mode may have been triggered by some catastrophic event, and that catastrophic event may have taken out other, less reliable sensors or those less reliable sensors are outputting very erroneous values, which is the cause of the problem).

In contrast, non-inertial sensors do not reply upon inertia and they tend to be less robust than inertial sensors. Some examples of non-inertial sensors include LIDAR and GPS. As an example of how a GPS receiver can lose its position, in an urban canyon the relatively tall buildings block the GPS signal and cause the GPS signal to reflect a great deal. This makes it difficult for the GPS receiver to determine its position. In another example, the GPS signal may be jammed such that the GPS receiver is not able to receive a strong and/or clear signal. For this reason, it is undesirable to rely upon non-inertial sensors (e.g., in some feedback loop) when performing or otherwise executing an emergency landing procedure. That said, non-inertial sensors may provide useful information and in some embodiments are used to generate the emergency landing procedure. Some examples of this are described in more detail below.

Some other systems try to handle emergency landings and/or component failure by duplicating all systems, including expensive and heavy non-inertial systems such as GPS or LIDAR. These aircraft may use GPS and/or LIDAR in a feedback loop when performing an emergency landing and those components are duplicated to protect them and the integrity of the feedback loop. This increases the cost and weight of the aircraft and for lightweight and relatively inexpensive aircraft this is not an attractive solution. In contrast, because inertial sensors are used to perform the emergency landing procedure, the aircraft can remain relatively inexpensive and lightweight even if an inertial navigation system were duplicated or made redundant (e.g., because they are cheap and lightweight). There are many off-the-shelf MEMS gyroscopes, MEMS accelerometers, and inertial navigation systems which are relatively inexpensive and lightweight.

The following figure illustrates an example of an aircraft which performs the process of FIG. 1.

Figure 2:
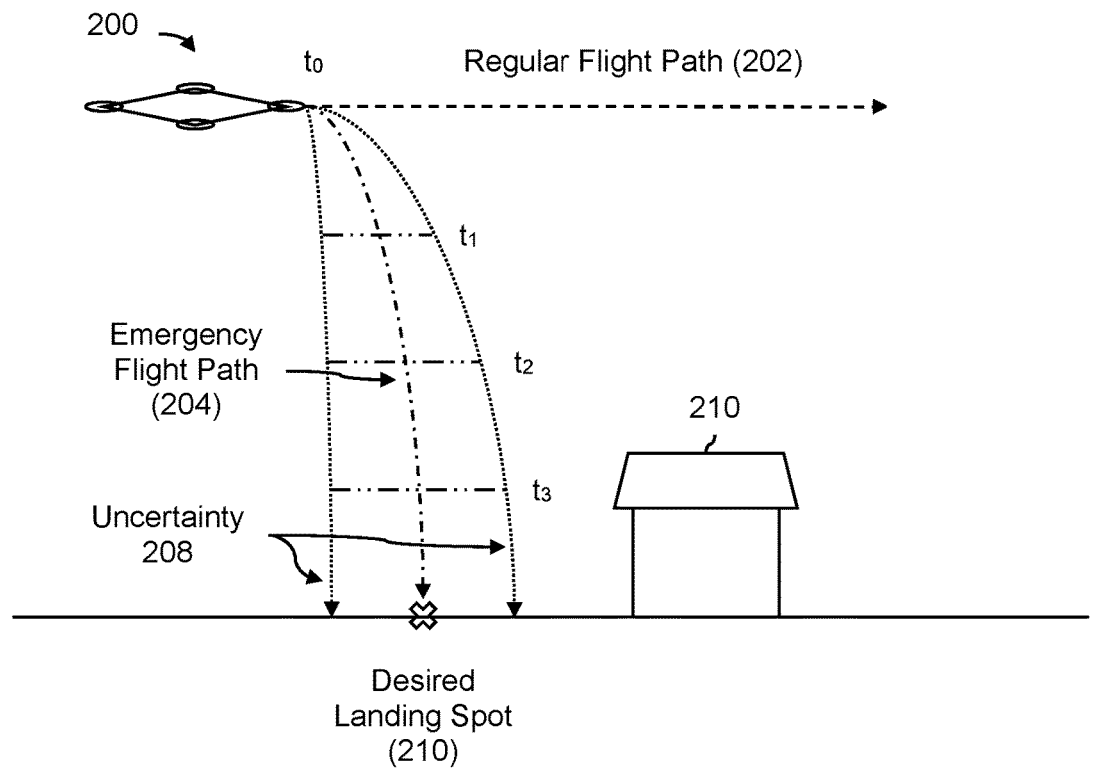
FIG. 2 is a diagram illustrating an embodiment of a quadcopter which continuously generates an emergency landing procedure.
Figure 2:
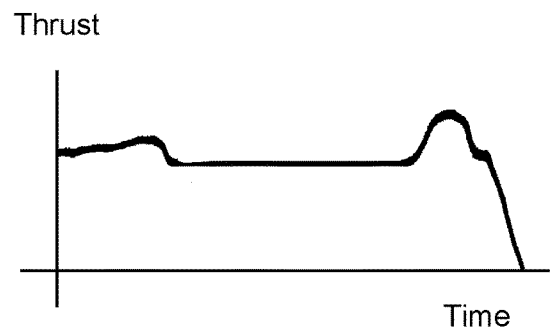

FIG. 2 is a diagram illustrating an embodiment of a quadcopter which continuously generates an emergency landing procedure. In the example shown, aircraft 200 is a quadcopter and is one example of an aircraft which performs the process of FIG. 1. Although not shown here, the quadcopter may be a single-seat aircraft with no room for an instructor or more experienced pilot.

In the example shown, two paths for the aircraft are shown. Regular flight path 202 shows the path the aircraft would follow if the aircraft were to remain in a regular flight mode. For example, the aircraft may be directed by a pilot to fly along path 202. While in the normal flight mode, emergency landing procedures are continuously being generated by the aircraft. Path 204 (shown with a dotted and dashed line) shows the (e.g., ideal or nominal) emergency flight path the aircraft would follow if the current emergency landing procedure were performed.

Table 206 shows an example of an emergency landing procedure. In this example, each entry in the table includes a time, a corresponding desired attitude, and a corresponding commanded thrust which are asserted or otherwise used to configure some actuator in the aircraft at the specified time. For multicopters, it may be more important (e.g., compared to winged aircraft) to have (commanded) thrust values as part of the emergency landing sequence because a multicopter needs the thrust values to remain airborne (e.g., whereas a winged aircraft could descend by gliding down using its wings). Diagram 220 shows an example thrust graph with thrust in the y-axis and time in the x-axis. In this example, the attitudes are input to a feedback loop and so those values are referred to as "desired" attitudes (e.g., because in a feedback loop there is a concept of a desired value and an actual or measured value, from which an error value is obtained). In contrast, the thrust values are not part of the feedback loop and are therefore referred to as "commanded" thrusts (e.g., because some block or component is commanded with those values) and not "desired" thrusts. At time $t_0$ (e.g., if the emergency landing procedure were performed), the first desired attitude (i.e., $attitude_0$) and the first commanded thrust (i.e., $thrust_0$) in the sequence would be used to control the actuators of the aircraft. Subsequently, at times $t_1$, $t_2$, and $t_3$, (e.g., if the emergency landing sequence was performed), desired attitudes of $attitude_1$, $attitude_2$, and $attitude_3$ (respectively) and commanded thrusts of $thrust_1$, $thrust_2$, and $thrust_3$ (respectively) would be used to control the actuators so as to fly at those desired attitudes. Using desired attitudes and commanded thrusts in a sequence of controls settings is merely exemplary and is not intended to be limiting.

In some embodiments, the first control setting in an emergency landing procedure is associated with leveling or zeroing out the roll and the pitch of the aircraft (e.g., so the aircraft is parallel to the surface of the ground) and steadying the altitude of the aircraft (e.g., if the aircraft was either ascending or descending, this would cause the aircraft to level out at some constant altitude before the next control setting in the emergency landing procedure is executed).

Due to a variety of factors (e.g., cross wind, some error in the estimation of the airplane's current position or other state information, uncertainty in a model used to generate the emergency landing procedure, etc.), the actual landing path may differ from the emergency flight path shown with a dashed and dotted line (204). This uncertainty or error in the emergency flight path is shown by dotted lines (208). In some embodiments, this uncertainty is taken into account when generating the emergency landing procedure (e.g., when generating the emergency landing procedure, an emergency landing controller ensures that the uncertainty does not overlap with any detected objects, such as object 210, in order to prevent collisions).

In one example of how the emergency landing procedure is generated, an emergency landing controller obtains state information about the aircraft from a variety of sensors. For example, the emergency landing controller may input a current position, a current orientation, and/or a current heading which are obtained or otherwise generated from GPS (which is non-inertial), a gyroscope (which is an inertial sensor), and/or an accelerometer (e.g., which is an inertial sensor). The emergency landing controller may also have a list of preapproved or permitted landing spots. For example, suppose the aircraft is an overwater aircraft which is designed to take off and land over water. In one example, the overwater aircraft is permitted to land anywhere on the body of water, excluding some perimeter (e.g., an approved landing spot has to be at least a certain distance from shore) to prevent the pilot from being thrown on a hard surface and/or to prevent the aircraft from flipping over at the shore. The emergency landing controller may use the current state information to select the closest preapproved landing spot and determine emergency landing procedure. Any appropriate routing or path determination process may be used and for brevity is not described herein.

In some embodiments, determination of the emergency landing procedure includes object detection and avoidance. For example, the uncertainty (208) around the emergency flight path (204) does not currently (e.g., in the figure) overlap with the structure on the ground (210). However, as the aircraft continues to fly along the regular flight path, the uncertainty will eventually include the structure (210). In some embodiments, the emergency landing controller performs or has access to LIDAR-based object detection and avoidance. The emergency flight path (e.g., at that time in the future) is generated or routed so that the uncertainty around it does not include the detected structure. In some embodiments, a detected object which is avoided is also airborne. Any appropriate object detection and avoidance technique may be used and for brevity is not described herein.

As described above, it may be decided to land the aircraft using the most recently generated emergency landing procedure for a variety of reasons. In some embodiments, the decision is made by a person, such as a pilot or a person on the ground. For example, the aircraft may be a recreational aircraft where the aircraft is rented out and pilots of the aircraft are often inexperienced and/or unfamiliar with the controls of the aircraft. In some embodiments, the aircraft is equipped with a switch or control which permits the pilot to initiate the most recent emergency landing procedure if the pilot wants to land but feels (s)he cannot land the aircraft on his/her own.

In some embodiments, there is an on-the-ground controller which can cause a selected aircraft to perform the most recent emergency landing procedure. This would permit an employee of a company renting out the aircraft to remotely cause a selected one of the aircraft to land, for example if the employee felt a pilot was too scared to land the aircraft on their own. Or, one of the pilots may be flying in a reckless manner and/or is not obeying instructions to fly in a more responsible manner and/or land the aircraft. Such a remote control would permit the aircraft to be remotely landed, even if the pilot does not wish to land the aircraft.

In some embodiments, the flight computer detects some condition or state and causes the most recent emergency landing procedure to be performed. For example, there may be some indication that some equipment has failed (e.g., one of the non-inertial sensors has failed, such as LIDAR or GPS). Some other examples included detecting that a wire break has occurred, or detecting that a processor has frozen or is otherwise unresponsive. In another example, it may be determined that the aircraft is being flown in an unsafe and/or unstable manner, such as when a pilot causes the aircraft to oscillate. An example of pilot induced oscillation and its detection is described in more detail below.

This illustrates a benefit associated with this technique: a pilot is not necessary to land the aircraft and can even be bypassed if the pilot is unable or unwilling to land the aircraft. The technique described herein permits the aircraft to land without requiring a pilot, for example in response to an instruction to perform the emergency landing procedure or if some condition or state is detected.

In some embodiments, even while the emergency landing procedure is being used to land the aircraft, the emergency landing procedure continues to be updated. For example, if a non-inertial sensor (such as GPS or LIDAR) is still available, it may be used to update the emergency landing procedure even while the emergency landing procedure is being executed. This would, for example, permit a better and/or softer landing where the uncertainty is smaller because more recent state information about the aircraft is available. Alternatively, if the non-inertial sensor is not available (e.g., because whatever event caused the emergency landing procedure to be performed also made the inertial sensor non-operational) then the last generated emergency landing procedure is used. Even though the emergency landing procedure is no longer being updated, any landing procedure is better than no landing procedure.

The following figure describes some of the concepts described above more formally in a flowchart.

Figure 3:
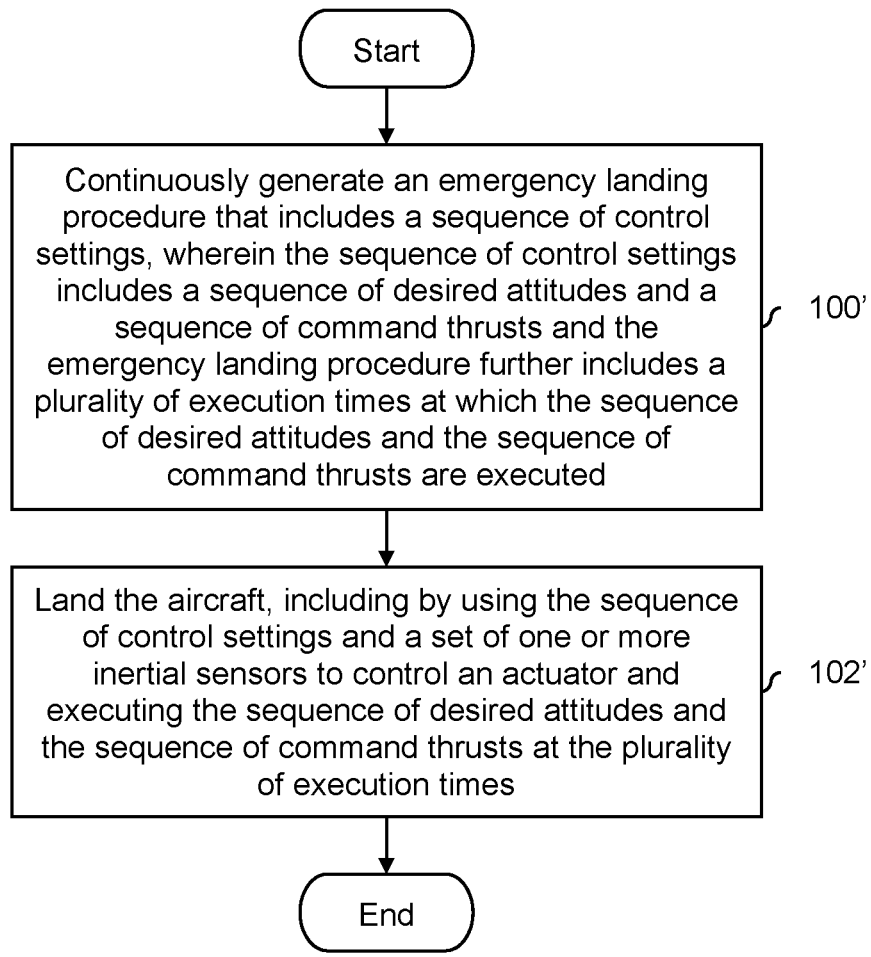
FIG. 3 is a flowchart illustrating an embodiment of a process to continuously generate an emergency landing procedure which includes desired attitudes and commanded thrusts and times at which to assert those values.

FIG. 3 is a flowchart illustrating an embodiment of a process to continuously generate an emergency landing procedure which includes desired attitudes and commanded thrusts and times at which to assert those values. The process of FIG. 3 is similar to the process of FIG. 1 and similar reference numbers are used to show related steps.

At 100', an emergency landing procedure that includes a sequence of control settings is continuously generated, wherein the sequence of control settings includes a sequence of desired attitudes and a sequence of command thrusts and the emergency landing procedure further includes a plurality of execution times at which the sequence of desired attitudes and the sequence of command thrusts are executed. See, for example, table 206 in FIG. 2 which is generated as part of the emergency landing procedure. The left column shows the execution times, the middle column shows the desired attitudes, and the right column shows the commanded thrusts (e.g., if the emergency landing procedure were performed).

At 102', the aircraft is landed, including by using the sequence of control settings and a set of one or more inertial sensors to control an actuator and executing the sequence of desired attitudes and the sequence of command thrusts at the plurality of execution times. For example, in FIG. 2, at time $t_0$, the desired attitude of attitude$_0$ and commanded thrust of thrust$_0$ would be used or otherwise executed. Later, at time $t_1$, the desired attitude of attitude$_1$ and commanded thrust of thrust$_1$ would be used and so on. In FIG. 2, this would cause the aircraft to ideally fly along the emergency flight path (204).

The following figures illustrate an exemplary block diagram of a system which performs the process of FIG. 3.

Figure 4A:
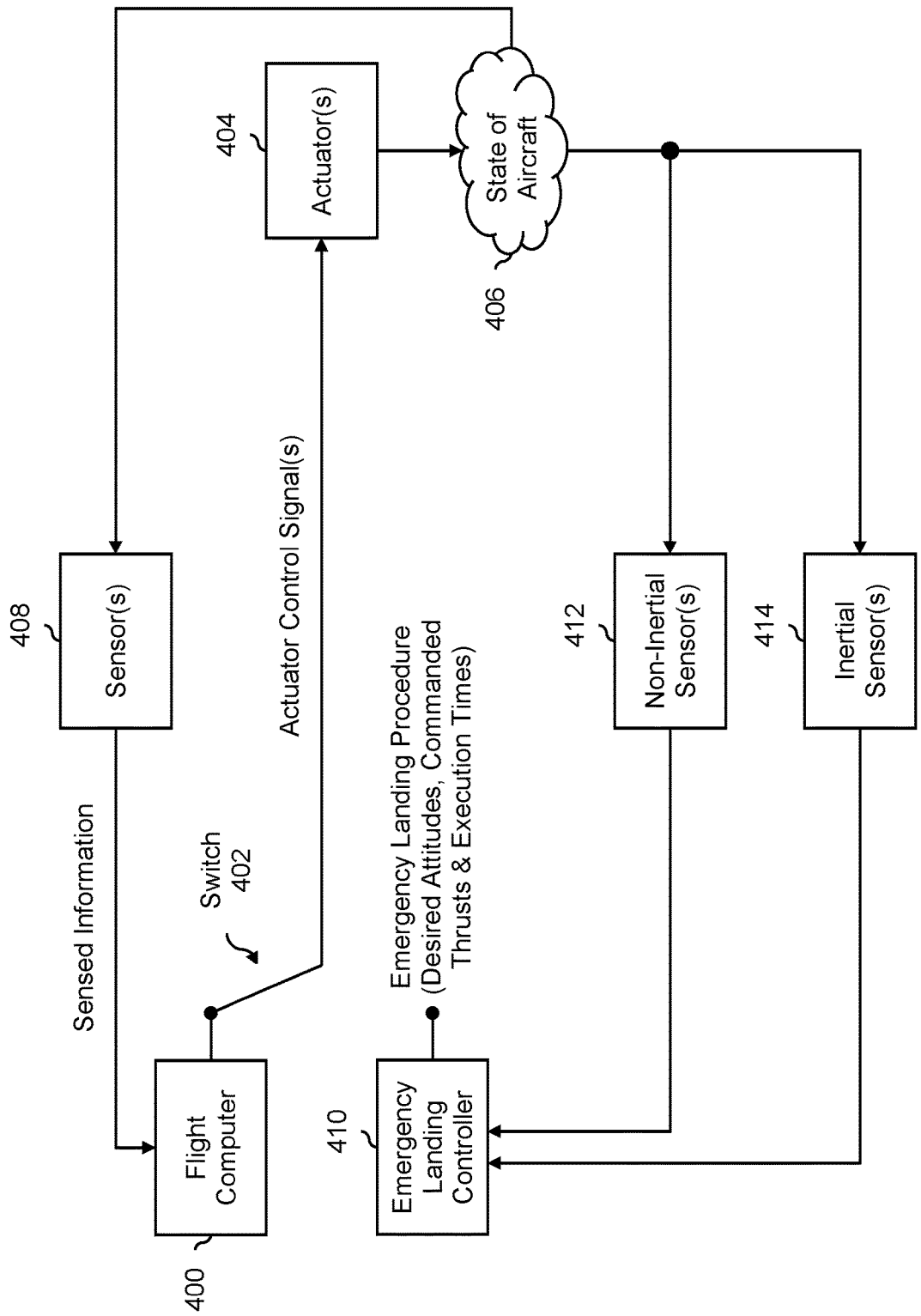
FIG. 4A is a diagram illustrating a block diagram of an aircraft during a normal flight mode where the aircraft continually generates an emergency landing sequence.

FIG. 4A is a diagram illustrating a block diagram of an aircraft during a normal flight mode where the aircraft continually generates an emergency landing sequence. In the example shown, the aircraft is in a normal flight mode. As such, the flight computer (400) is in control of the actuators (404) of the aircraft. In the position shown, switch 402 selects the actuator control signal output by the flight computer as opposed to the emergency landing procedure output by the emergency landing controller (410). In the mode shown, the flight computer receives instructions from a pilot (e.g., through a joystick or some other type of controller) and generates one or more actuator control signal(s) in response to the pilot's instructions.

The actuator control signal(s) output by the flight computer are used to control one or more actuators (404). In FIG. 2, for example, there may be four actuator control signals and each actuator control signal tells a corresponding motor (e.g., associated with one of the rotors) how fast to rotate. The motors rotate at the specified speed, which causes changes in the state of the aircraft (406) such as position, attitude, velocity, etc. One or more sensor(s) (408) sample the state of the aircraft and provide sensed information to the flight computer. In some embodiments, sensor(s) 408 are the same sensors as 412 and 414 but for readability are show as separate or different components here. In various embodiments, sensor(s) 408 include non-inertial and/or inertial sensors. The flight computer (400) inputs the sensed information from the sensor(s) (408) and makes changes to the actuator control signal accordingly (e.g., based on the pilot's current instructions and the current sensed state of the aircraft). This control loop during the normal flight mode is shown for context and any appropriate components and/or flight control logic may be used.

While the flight computer is controlling the movement of the aircraft in this mode, the emergency landing controller (410) continuously generates an emergency landing procedure. In this example, the emergency landing procedure includes a sequence of desired attitudes, a sequence of commanded thrusts, and corresponding execution times, but naturally in other embodiments the emergency landing procedure may comprise other control settings. The emergency landing controller shown here is one example of a component which continuously generates an emergency landing procedure at step 100 in FIG. 1 or at step 100' in FIG. 3.

For ease of explanation, the emergency landing controller (410) is shown here as separate block from the flight computer (400) where a switch selects between the two. When actually implemented, in some embodiments the emergency landing controller is part of the flight computer. For example, a single processor or component may have two processes running on it: a first, "regular" process which performs the processing of flight computer 400 described above (e.g., controls the actuators of the aircraft during the normal flight mode shown) and a second, "emergency" process which performs the processing of emergency landing controller 410 described above (e.g., continuously generating an emergency landing procedure). Alternatively, two separate processors or components may be used.

To continuously generate the emergency landing procedure, the emergency landing controller uses information from one or more non-inertial sensors (412), such as LIDAR or GPS. For example, the emergency landing controller may be able to determine the current position of the aircraft (including latitude, longitude, and altitude) and velocity from the GPS. As non-inertial sensors, the LIDAR and GPS are not considered robust enough to be made a required or essential component when the emergency landing procedure is performed (that is, the emergency landing procedure is able to be performed even if LIDAR or GPS is not available). However, during the normal flight mode shown here, the LIDAR and GPS are assumed to be available, contain useful information, and are therefore used to generate the emergency landing procedure.

The emergency landing controller also obtains information from one or more inertial sensors (414), such as a MEMS gyroscope and/or a MEMS accelerometer. For example, from a MEMS gyroscope and a MEMS accelerometer, the emergency landing control would know the current attitude (e.g., roll, pitch, and yaw) of the aircraft.

In this example, the emergency landing procedure maintains a list or collection of preapproved or permitted landing spots. From the GPS information, the emergency landing controller knows the current position of the aircraft and direction of travel and selects the closest permitted landing spot that the aircraft is heading towards. In some embodiments, a (range of) predefined angle(s) of descent (i.e., trajectories) is also used to select a landing spot. The emergency landing controller then (as an example) determines appropriate desired attitudes and times at which to use or otherwise execute those desired attitudes to land the aircraft at the selected landing spot.

The LIDAR information in this example is used to detect and avoid objects in the emergency landing path (e.g., by rerouting the emergency landing path around the object without changing the selected landing spot, or by selecting a new landing spot where the emergency landing path for the new landing spot does not overlap with the object).

As described above, a variety of events may cause the switch to select the emergency landing controller instead of the flight computer. In some embodiments, an instruction from the pilot or someone on the ground causes the switch to change positions. An example is described in more detail below where the emergency landing controller automatically detects when the aircraft is oscillating and automatically causes the aircraft to switch to the emergency landing mode. The following figure shows an exemplary block diagram in that mode.

Figure 4B:
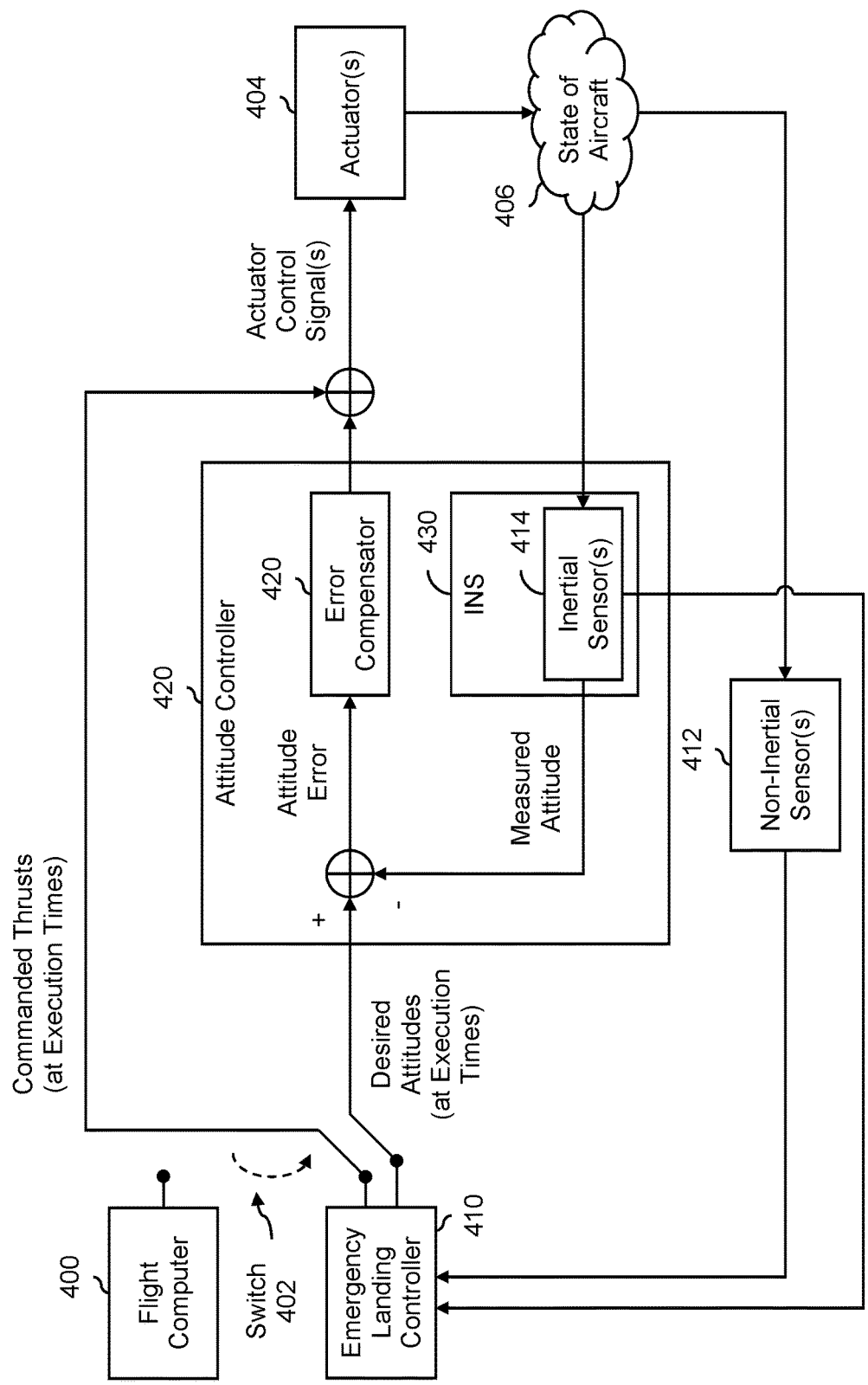
FIG. 4B is a diagram illustrating a block diagram of an aircraft during an emergency landing mode where the aircraft is landing using the emergency landing sequence and a set of one or more inertial sensors.

FIG. 4B is a diagram illustrating a block diagram of an aircraft during an emergency landing mode where the aircraft is landing using the emergency landing sequence and a set of one or more inertial sensors. This figure continues the example of the previous figure. In the state shown, the switch (402) is now selecting the output of the emergency landing controller (410) instead of the output of the flight computer (400). For clarity and readability, some components which were shown in the previous figure are not shown here and vice versa. Some components have also moved position from the previous figure.

With the switch in the position shown, the last generated emergency landing procedure is used to control the actuators (404) of the aircraft. The sequence of desired attitudes is passed from the emergency landing controller (410) to the attitude controller (420), one at a time at the appropriate execution time. The attitude controller inputs a desired attitude and outputs one or actuator control signals which control the one or more actuators in the aircraft.

The attitude controller includes a feedback loop which includes one or more inertial sensors (414) which are part of an inertial navigation system (INS) (430). For clarity and readability, the placement of the inertial sensor(s) has been moved in this figure and is also shown as part of INS 430. In some embodiments, the INS is part of flight computer 400. The INS in this example provides a measured attitude, which is subtracted from the desired attitude which is being input at that time. This produces an attitude error which the error compensator (420) uses to determine an appropriate signal to output. Although shown separately here in this diagram, in some embodiments, parts of the attitude controller (e.g., the error compensator, the INS, etc.) are part of the flight computer (400). The blocks are arranged as shown for clarity and ease of explanation.

Outside of the feedback loop, the sequence of commanded thrusts (at the appropriate execution times) are passed via switch 402 from emergency landing controller 410 to combiner 432 which outputs actuator control signal (s). In other words, the commanded thrusts are performed but it is not known for sure if the aircraft is actually achieving the specified thrust values, nor is any adjustment or correction performed based on the actual state of the aircraft since there is no feedback loop for the commanded thrusts.

In some cases, the non-inertial sensor(s) (412) and inertial sensor(s) (414) are all operational. If so, the emergency landing controller (410) in some embodiments continues to update the emergency landing procedure. For example, this may permit a softer landing. Alternatively, if the non-inertial sensor(s) is/are not available, the last generated emergency landing sequence is used to land the aircraft.

In some embodiments, an emergency landing controller uses machine learning (e.g., performed ahead of time when the aircraft is being designed) in order to generate the emergency landing procedure. The following figure describes an example of this.

Figure 5:
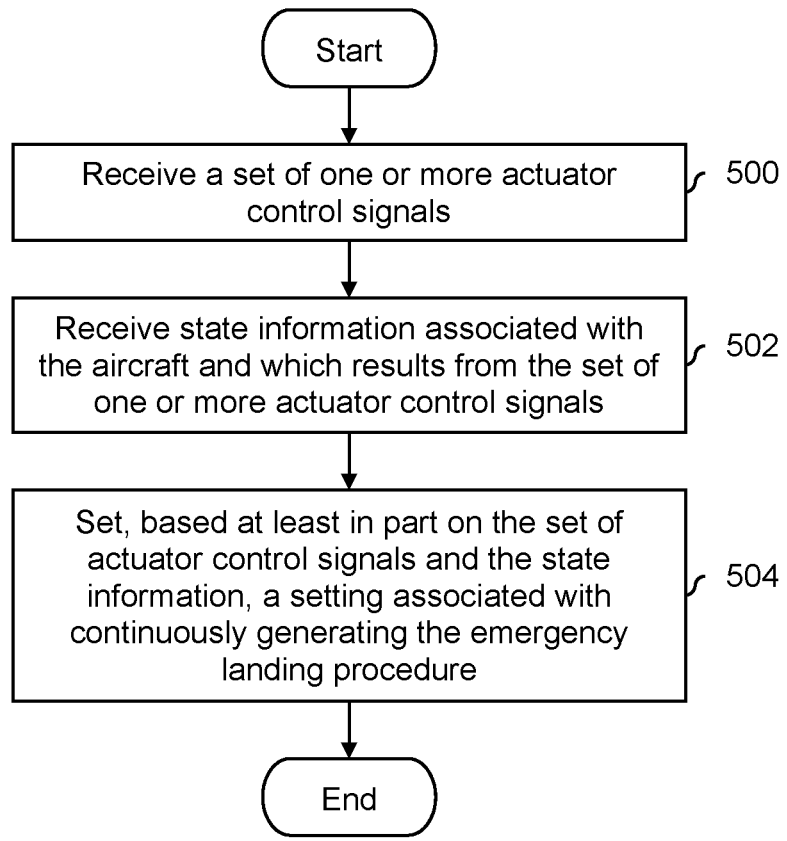
FIG. 5 is a flowchart illustrating an embodiment of a process to perform machine learning.

FIG. 5 is a flowchart illustrating an embodiment of a process to perform machine learning. For example, emergency landing controller 410 in FIG. 4A or 4B may perform incorporate machine learning which observes actuator control signals passed to some actuators and how the aircraft actually responds.

At 500, a set of one or more actuator control signals is received. At 502, state information associated with the aircraft and which results from the set of one or more actuator control signals is received. For example, during the design phase of an aircraft, a prototype of the aircraft may be tested. Actuator control signals (e.g., which control or are otherwise input to one or more actuators) during the test flights are observed and the resulting states of the aircraft (e.g., velocity, position, attitude, etc.) are observed and recorded.

At 504, a setting associated with continuously generating the emergency landing procedure is set based at least in part on the set of actuator control signals and the state information. For example, in FIG. 4A, emergency landing controller 410 may include a model with one or more settings which are set or otherwise programmed per the process described above. This model is used during the normal model shown in FIG. 4A to (continuously) generate an emergency landing procedure. Any appropriate machine learning technique may be used and for brevity an outline is described herein.

As described above, in some embodiments, an emergency landing procedure (e.g., the most recent one) is performed in the event the emergency landing controller determines that the aircraft is oscillating. The following figures illustrate some examples of oscillation and a process for detecting it.

Figure 6:
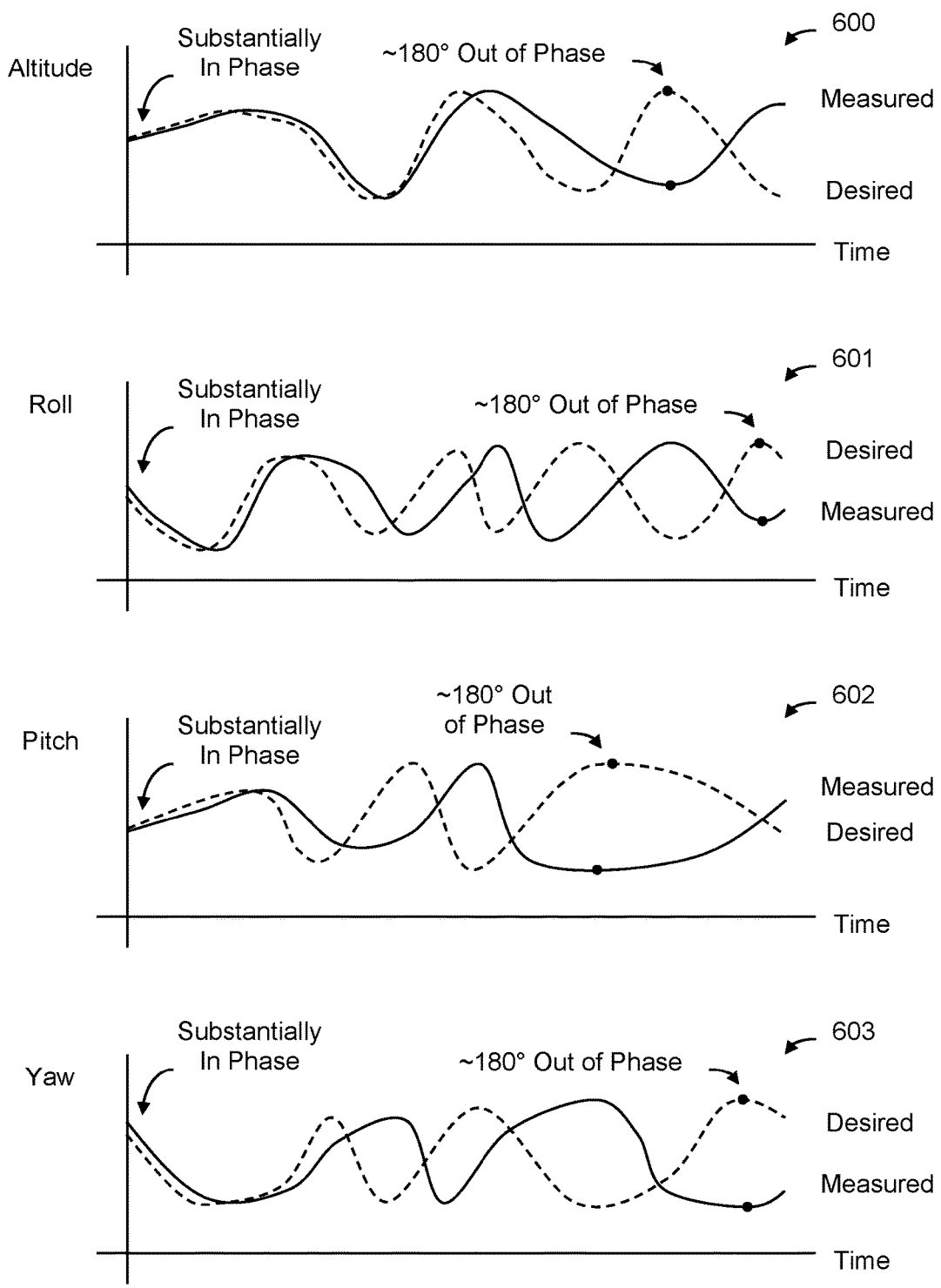
FIG. 6 is a diagram illustrating various embodiments of pilot induced oscillation.

FIG. 6 is a diagram illustrating various embodiments of pilot induced oscillation. As described above, in some embodiments the aircraft is a recreational aircraft which is rented out and some of the pilots flying the aircraft are inexperienced and/or unfamiliar with the controls of the aircraft. As a result, a pilot may cause an oscillation in the aircraft.

Diagrams 600-603 show examples of oscillation with respect to altitude, roll, pitch, and yaw, respectively. In those diagrams, the solid lines show the measured values. For example, the measured altitude signal may be obtained using GPS and the measured roll, pitch, and yaw signals (e.g., which collectively describe the attitude of the plane) may be measured using gyroscopes and accelerometers. Dotted lines show the desired value at a particular time. For example, these desired values may be output or generated by a flight computer during a normal flight mode.

In all of the diagrams, the desired signals closely match the measured signals in the beginning, with the measured signals lagging slightly behind the desired signals (e.g., because it takes some time for the aircraft to respond). Over time, the measured signals diverge from their corresponding desired signals until they are (roughly) 180° out of phase with respect to each other (e.g., one signal has a local minimum while almost simultaneously the other signal has a local maximum). In some embodiments, inflection points (e.g., a local minimum or local maximum) are used to detect when the two signals are sufficiently out of phase with respect to each other. For example, if a local minimum for one signal and a local maximum for the other signal both occur within a certain amount of time (see, e.g., the dots shown in diagrams 600-603), the two signals are declared to be sufficiently out of phase and the emergency landing procedure is performed.

When a desired signal and a measured signal are (roughly) 180° out of phase as shown here, it may be difficult for the flight computer to respond quickly enough for the measured signal to catch up to the desired signal so that they are substantially in phase again. For this reason, in some embodiments, when a desired signal is sufficiently out of phase with respect to a corresponding measured signal, the emergency flight controller declares that a (e.g., pilot induced) oscillation has been detected and the aircraft will switch from a normal flight mode to an emergency flight mode (at least in this example).

To ensure that a genuine oscillation is being observed (e.g., as opposed to noise in the signal which causes smaller changes in the amplitude), a minimum amplitude difference may be specified. For example, if the difference in altitude, roll, pitch, etc. between the local minimum and local maximum is less than the minimum amplitude difference, then no oscillation is declared. That is, it is determined or concluded that there is noise in the signal (i.e., not an oscillation) because there was only a slight change in the amplitude.

Using FIG. 4A as an example, the desired signals shown here may be obtained from flight computer 400. These desired signals may be an alternative to or in addition to the actuator control signal(s) which FIG. 4A shows flight computer 400 outputting. The measured signals may be obtained from non-inertial sensor(s) 412 and/or inertial sensor(s) 414.

The following figure more formally describes this process for detecting an oscillation and (in response) switching from a normal flight mode to an emergency landing mode.

Figure 7:
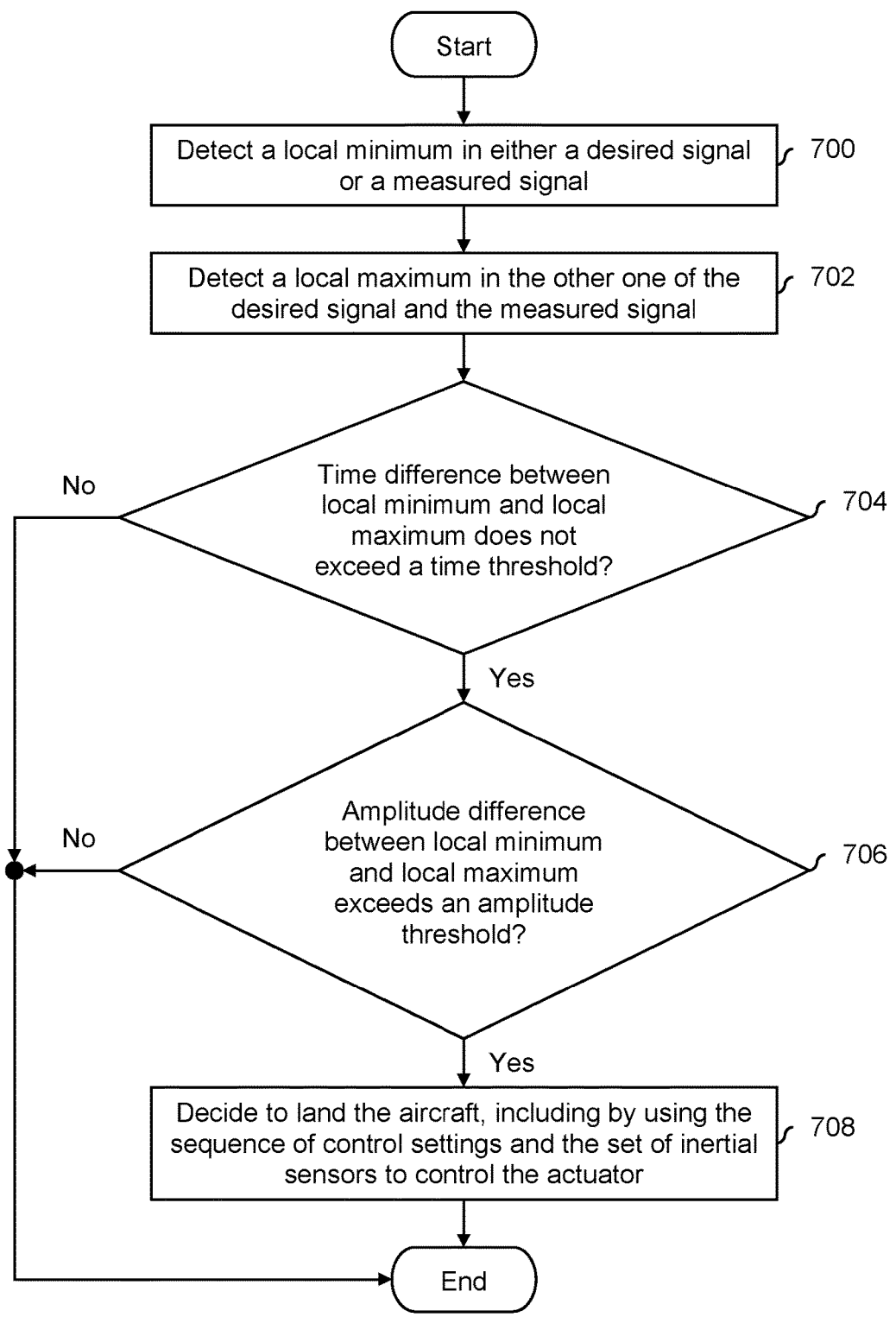
FIG. 7 is a flowchart illustrating an embodiment of a process to automatically detect an oscillation and switch to an emergency landing mode.

FIG. 7 is a flowchart illustrating an embodiment of a process to automatically detect an oscillation and switch to an emergency landing mode. Emergency landing controller 410 in FIG. 4A shows one example of a component or block which performs this example process. In the event an oscillation is detected by the emergency landing controller, the emergency landing controller would cause the switch (402) to select the output of the emergency landing controller (410) instead of the output of the flight computer (400).

At 700, a local minimum is detected in either a desired signal or a measured signal. At 702, a local maximum is detected in the other one of the desired signal and the measured signal. See, for example, the dots shown in the previous figure which show some exemplary local minima and local maxima.

At 704, it is determined if the time difference between the local minimum and the local maximum does not exceed a time threshold. For example, in the previous figure this corresponds to the two dots having a difference in x values that is within some time threshold (where the x-axis of the graphs is time).

If it is determined at 704 that the time threshold is not exceeded, then at 706 it is determined whether an amplitude difference between the local minimum and the local maximum exceeds an amplitude threshold. As described above, if the amplitude changes only slightly, then it is noise in the signal and not a genuine oscillation.

In the context of FIG. 1, steps 700-706 may be performed repeatedly while step 100 in FIG. 1 is being performed. That is, the emergency landing controller monitors for oscillations while an emergency landing procedure is being continuously generated (but not necessarily used).

If it is determined at 706 that the amplitude threshold is exceeded, then at 708 it is decided to land the aircraft, including by using the sequence of control settings and the set of inertial sensors to control the actuator. In the context of FIG. 1, for example, the decision at step 708 would cause step 102 to be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
an actuator;
a set of one or more inertial sensors; and a processor configured to:
continuously generate an emergency landing procedure that includes a sequence of control settings;
detect a local maximum in the other one of the desired signal and the measured signal;
determine if a time difference between the local minimum and the local maximum does not exceed a time threshold;
determine if an amplitude difference between the local minimum and the local maximum exceeds an amplitude threshold;
in the event it is determined that the time difference does not exceed the time threshold and it is determined that the amplitude difference exceeds the amplitude threshold,
decide to land the aircraft, including by using the sequence of control settings and the set of inertial sensors to control the actuator; and
land the aircraft, including by using the sequence of control settings and the set of inertial sensors to control the actuator.

2. The aircraft of claim 1, wherein:
the actuator is associated with one of a plurality of rotors in a multicopter; and
the sequence of control settings are associated with rotational speed.

3. The aircraft of claim 1, wherein:
the sequence of control settings includes a sequence of desired attitudes;
the emergency landing procedure further includes a plurality of execution times at which the sequence of desired attitudes are executed; and
landing the aircraft further includes executing the sequence of desired attitudes according to the plurality of execution times.

4. The aircraft of claim 1, wherein:
the processor is further configured to receive an indication to land the aircraft; and
the processor lands the aircraft, including by using the sequence of control settings and the set of inertial sensors to control the actuator, in response to receiving the indication.

5. The aircraft of claim 1, wherein:
the processor is further configured to receive an indication to land the aircraft;
the processor lands the aircraft, including by using the sequence of control settings and the set of inertial sensors to control the actuator, in response to receiving the indication; and
the indication is transmitted from an on-the-ground controller.

6. The aircraft of claim 1, wherein:
the processor is further configured to receive an indication to land the aircraft;
the processor lands the aircraft, including by using the sequence of control settings and the set of inertial sensors to control the actuator, in response to receiving the indication; and
the indication is received via a controller included in the aircraft.

7. The aircraft of claim 1, wherein the processor is further configured to:
receive a set of one or more actuator control signals;
receive state information associated with the aircraft and which results from the set of one or more actuator control signals; and set, based at least in part on the set of actuator control signals and the state information, a setting associated with continuously generating the emergency landing procedure.

8. A method, comprising:
continuously generating, using a processor, an emergency landing procedure that includes a sequence of control settings;
detecting a local maximum in the other one of the desired signal and the measured signal;
determining if a time difference between the local minimum and the local maximum does not exceed a time threshold;
determining if an amplitude difference between the local minimum and the local maximum exceeds an amplitude threshold;
in the event it is determined that the time difference does not exceed the time threshold and it is determined that the amplitude difference exceeds the amplitude threshold,
deciding to land the aircraft, including by using the sequence of control settings and the set of inertial sensors to control the actuator; and
landing an aircraft, including by using the sequence of control settings and a set of one or more inertial sensors to control the actuator.

9. The method of claim 8, wherein:
the actuator is associated with one of a plurality of rotors in a multicopter; and
the sequence of control settings are associated with rotational speed.

10. The method of claim 8, wherein:
the sequence of control settings includes a sequence of desired attitudes;
the emergency landing procedure further includes a plurality of execution times at which the sequence of desired attitudes are executed; and
landing the aircraft further includes executing the sequence of desired attitudes according to the plurality of execution times.

11. The method of claim 8 further including receiving an indication to land the aircraft, wherein landing the aircraft includes using the sequence of control settings and the set of inertial sensors to control the actuator, in response to receiving the indication.

12. The method of claim 8 further including receiving an indication to land the aircraft, wherein:
landing the aircraft includes using the sequence of control settings and the set of inertial sensors to control the actuator, in response to receiving the indication; and
the indication is transmitted from an on-the-ground controller.

13. The method of claim 8 further including receiving an indication to land the aircraft, is wherein:
landing the aircraft includes using the sequence of control settings and the set of inertial sensors to control the actuator, in response to receiving the indication; and
the indication is received via a controller included in the aircraft.

14. The method of claim 8 further including:
receiving a set of one or more actuator control signals;
receiving state information associated with the aircraft and which results from the set of one or more actuator control signals; and
setting, based at least in part on the set of actuator control signals and the state information, a setting associated with continuously generating the emergency landing procedure.

15. A computer program product, the computer program product being embodied in a non-transitory computer readable storage medium and comprising computer instructions for:
continuously generating an emergency landing procedure that includes a sequence of control settings;
detecting a local maximum in the other one of the desired signal and the measured signal;
determining if a time difference between the local minimum and the local maximum does not exceed a time threshold;
determining if an amplitude difference between the local minimum and the local maximum exceeds an amplitude threshold;
in the event it is determined that the time difference does not exceed the time threshold and it is determined that the amplitude difference exceeds the amplitude threshold,
deciding to land the aircraft, including by using the sequence of control settings and the set of inertial sensors to control the actuator; and
landing an aircraft, including by using the sequence of control settings and a set of one or more inertial sensors to control the actuator.

* * * * *